United States Patent [19]
Dotan

[11] Patent Number: 5,822,517
[45] Date of Patent: Oct. 13, 1998

[54] METHOD FOR DETECTING INFECTION OF SOFTWARE PROGRAMS BY MEMORY RESIDENT SOFTWARE VIRUSES

[76] Inventor: Eyal Dotan, 28 rue Etienne Ganneron, 77600 Bussy St. George, France

[21] Appl. No.: 631,917

[22] Filed: Apr. 15, 1996

[51] Int. Cl.$^6$ .............................. H04L 9/00; H04K 1/00
[52] U.S. Cl. ............... 395/186; 395/183.14; 395/183.15
[58] Field of Search .............................. 395/186, 183.14, 395/182.04, 183.15, 185.01

[56] References Cited

U.S. PATENT DOCUMENTS

| | | | |
|---|---|---|---|
| 5,319,776 | 6/1994 | Hile | 395/575 |
| 5,349,655 | 9/1994 | Mann | 395/575 |
| 5,359,659 | 10/1994 | Rosenthal | 380/4 |
| 5,398,196 | 3/1995 | Chambers | 364/580 |
| 5,408,642 | 4/1995 | Mann | 395/575 |
| 5,448,668 | 9/1995 | Perelson et al. | 395/182.19 |
| 5,473,769 | 12/1995 | Cozza | 395/183.15 |
| 5,493,649 | 2/1996 | Slivka et al. | 395/185.01 |
| 5,502,815 | 3/1996 | Cozza | 395/183.14 |
| 5,613,002 | 3/1997 | Kephart et al. | 380/4 |

Primary Examiner—Robert W. Beausoliel, Jr.
Assistant Examiner—Ly V. Hua
Attorney, Agent, or Firm—Ariel Reich

[57] ABSTRACT

A method for detecting the infection of executable computer software programs by memory resident computer software virus programs is provided. The invented method comprises comparing an initial state of an executable program to a final state of the program. If the final state of the program is different than the initial state, then the method generates an alarm signal to inform a user that the program has been modified by a virus and is infected. Particularly, as a program is called into memory, that state of the program is marked as the initial state. When execution of the program is completed, that state of the program is marked as the final state. Alternatively, at the moment when processing of the program commences, that state of the program is marked as the final state of the program. The method compares the final and initial states to determine if the two states match. If the two states are the same, then it is confirmed that the program was not modified and is not infected. If it is determined that the two states are different, then the method generates an alarm signal to inform the user that the program is infected. Additionally, if the final state does not match the initial state, a known backup and restore technique can be invoked by the method for restoring the infected program to its initial state.

11 Claims, 4 Drawing Sheets

METHOD FOR DETECTING INFECTION OF SOFTWARE PROGRAMS BY MEMORY RESIDENT SOFTWARE VIRUSES

BACKGROUND OF THE INVENTION

1. Field of the Invention

The present invention relates generally to computer software, and more particularly, to a method for detecting the infection of executable computer software programs by memory resident computer software virus programs.

2. Description of Related Art

Computer software virus programs are malicious programs adapted to corrupt executable computer software programs, such as by replicating themselves over an existing program or by adding code to the beginning or end of the executable program. Since their appearance, the number, performance, and intelligence of virus programs has greatly increased. A software virus that is rapidly detected has a very small chance of surviving without detection for a substantial time period, and thus is not an effective virus. Therefore, the persons who write computer viruses invest considerable time and effort making their viruses increasingly transparent and difficult to detect by computer users.

The most common of computer software virus programs are known as "memory resident viruses". These memory resident viruses reside in the memory of a computer once they are activated. After the virus program is activated, the virus resides in memory and waits until uninfected or "clean" executable computer software program is invoked by a computer user or by any other program. When the clean program is invoked by the user, the virus modifies the program by adding its own code to the clean program or overwriting a part of the program with the virus's code, thus infecting the program.

Most of today's computer viruses cannot be detected by the computer user, without using a program specifically designed for virus detection referred to as an "anti-virus" program. Anti-virus programs are therefore written for detection, and possibly destruction, of viruses. Obviously a very important goal of any anti-virus program is to detect the presence of a virus in a computer system as early as possible.

However, an equally important goal of anti-virus programs is avoiding false positives. That is, falsely positively identifying an executable program as a virus program. Avoiding false positives is important for providing a reliable anti-virus program that achieves a users trust. An effective method for detecting virus programs without making false positives, is to provide a method that generates an alarm signal only when it is confirmed that a virus program has been activated and has infected an executable program. Once a virus is detected, the anti-virus program typically signals the user, using some appropriate means, to inform them that a virus was detected. At that time, the infection process is considered to be halted, as the user knows that a virus is present in their computer system. The user may then clean the infected program or programs, using a suitable cleaning program, before resuming use of the computer system.

One of the most common methods of detecting virus programs is using a program referred to as a "scanner" program. Scanner programs, as is well known to those skilled in the art, search known typical virus data strings that may be in the code of executable programs stored in the computer system. The scanner programs search each of the programs in the computer one by one, in order to detect the presence of a virus in each of these programs. If a virus is detected by the scanner, the scanner can possibly clean the virus code out of the infected program, depending on the type of virus found and the type of scanner program.

However, a disadvantage of scanner programs is that their searching of viruses is somewhat time consuming and scanners are only capable of finding viruses that the scanner has been programmed to locate. Thus, the scanner may not be capable of finding viruses that were created after the scanner program was written. A further disadvantage of scanner programs is that between successive scanning operations, a virus can infect several programs in the computer without the user being aware of the infections, since the scanner only detects viruses when running.

A method for recovery of a computer program infected by a computer virus is disclosed in U.S. Pat. No. 5,408,642, to Mann. The disclosed method takes a unique fingerprint of a program to be recovered, along with data relating to the beginning portion of the program, and stores the fingerprint and data at a separate location. A fingerprinted program thought to be infected by a virus is processed for generating a fingerprint of a string of data of the program. The generated fingerprint is compared to the stored fingerprint, to determine if they match. If the fingerprints do not match, a value utilized to select the string can be incremented and the comparison process is repeated.

U.S. Pat. No. 5,349,655, to Mann, discloses a method for recovery of a computer program infected by a computer virus, similar to the method disclosed in U.S. Pat. No. 5,408,642, to Mann. The disclosed method includes generating strings of data prior to infection by a virus and storing the strings. Second strings of data are then generated and compared to the prior strings of data, to determine if the data has been corrupted by a virus and for recovering the data.

A disadvantage common to each of the methods disclosed by Mann, is that between the moment a program's first fingerprint is generated and stored, and the moment the program's second fingerprint is generated for checking, the program may have been changed or modified for reasons other than being infected by a virus. For example, the program may have been updated to a new version, which could cause the program code to be changed or the program may have been recompiled. This could potentially cause the first and second fingerprints to not match, rendering the methods disclosed by Mann ineffective. Another disadvantage of the disclosed methods, is that between two checking operations a virus can infect several programs without the user being aware of their infections, a disadvantage similar to the disadvantage of scanning programs. Still another disadvantage of the disclosed methods, is that each program's fingerprint must be stored on a storage medium, such as a magnetic hard disk drive, consuming available space on the hard drive, which could be used for storing other data.

U.S. Pat. No. 5,359,659, to Rosenthal, discloses a method for securing software against corruption by computer virus programs. The method disclosed by Rosenthal includes coupling security routines capable of detecting the presence of any virus infection, or other corruption, to a program. The loading information of an executable program is modified so that upon any attempt to execute the program, the security routines will execute first and scan for viruses or other corruption. If any viruses or corruption are detected, execution of the program is aborted and a warning is displayed. If no viruses or corruption are detected, the security routines are removed from the computer's memory and the program continues normally. A disadvantage of the disclosed method, is that it requires modifying the executable program. When a program that has been modified for virus detection by the method of Rosenthal is loaded into memory for executing the program, loading the program may be somewhat slower the an unmodified version of the same program, since virus detection operations are performed prior to executing the program.

U.S. Pat. No. 5,319,776, to Hile et al., discloses a method for in transit detection of computer viruses with a safeguard. The disclosed method tests data in transit between a source medium and a destination medium. Each character of an incoming data stream is tested against multiple search strings representing the signatures of multiple known computer viruses. When a virus is detected, the incoming data is prevented from remaining on the destination storage medium. However, a disadvantage of the method disclosed by Hile et al., is that it is only capable of locating viruses which it has been programmed to find, similar to the other disclosed prior art methods.

A method for protecting executable computer programs against infection by a computer virus program is disclosed in presently pending U.S. patent application Ser. No. 08/579,218, filed Dec. 28, 1995, wherein Applicant is the Inventor. The disclosed method prevents writing operations that attempt to modify portions of the computer program. The method selects significant data and stores the data, in order to retain information indicative of the program prior to any modification thereof. The invented method then determines if the writing operation is attempting to modify the significant data, and if it is determined that the writing operation is attempting to modify the data, an alarm is generated and the operation is denied. If it is determined that the writing operation is not attempting to modify the data, the writing operation as allowed to continue. Additionally, the program can be restored to its initial state using the program's significant data.

There, therefore exists a need for a method of detecting virus programs in a computer system that checks an executable program each time the program is invoked and which does not require a database of known virus programs for detecting viruses.

OBJECTS OF THE INVENTION

It is therefore an object of the present invention to provide an improved method for detecting the infection of executable computer software programs by memory resident computer software virus programs;

It is another object of the present invention to provide a method for detecting the infection of invoked executable computer software programs by memory resident computer software virus programs that does not require any modification of the executable programs;

It is a further object of the present invention to provide a method for detecting the infection of invoked computer programs by memory resident computer software viruses that has a low probability of generating a false positive recognition of a computer virus;

It is yet another object of the present invention to provide a method for detecting the infection of invoked computer programs by memory resident software viruses that does not consume a substantial amount of space on a storage medium;

It is a still further object of the present invention to provide a method for detecting the infection of invoked computer programs by memory resident software viruses that does not require a database of known computer viruses;

It is another object of the present invention to provide method for detecting the infection of invoked computer programs by memory resident viruses that automatically detects executable program infections, without the need for checking each executable program contained on the storage medium; and It is still another object of the present invention to provide a method for detecting the infection of invoked software programs by memory resident viruses that does not require separate program saving and program checking operations.

SUMMARY OF THE INVENTION

These and other objects and advantages of the present invention are achieved by providing an improved method for detecting the infection of executable computer software programs by memory resident computer software virus programs. Executable programs comprise a series of instructions that are executed by a central processing unit (CPU) of a computer system containing the program, when the program is invoked. The method of the present invention comprises comparing an initial state of an executable program to a final state of the program. If the final state of the program is different than the initial state, then the invented method generates an alarm signal to inform a user that the program most probably has been modified by a virus program and is now infected.

Particularly, when a computer user accesses an executable program for loading the program into memory from a storage medium, the invented method is invoked prior to the program being stored into memory. As the program is being loaded into memory, the method stores some pertinent information regarding the program, such as program length or header information, into memory to mark that state of the program as the initial state. After the initial state of the program is marked, execution of the program continues. When execution of the program is completed, the method again stores the program's pertinent information into memory, to mark that state of the program as the final state. Alternatively, after the initial state of the program is marked and the program is loaded into memory, at the moment when processing of the program commences, that state of the program is stored into memory as the final state of the program, as opposed to when processing of the program is completed.

Once the final state of the program is marked and stored into memory, the method of the present invention compares the information indicating final state of the program with the information indicating the initial state of the program. If the final state of the program matches the initial state, then it is confirmed that the program was not modified and therefore not infected by a virus. If it is determined that the final state of the program is different than the initial state, then the invented method generates an alarm signal to inform the user that the program has been modified by a virus and is now infected.

In an alternative embodiment of the present invention, if it is determined that the final state of the program does not match the initial state, the alarm signal is generated, as with the preferred embodiment. However, in the alternative embodiment, after the alarm is generated, a known backup and restore technique is invoked by the method for restoring the infected program to its initial state, using the pertinent information indicating the initial state of the program.

Since the invented method compares the state of the program when it is initially invoked, to the state of the program when it is either terminated or when processing has just commenced, for determining if the program is infected with a virus, the method of the present invention does not require any modification of the program. Thus, loading or processing of the program is not adversely affected. Since the invented method compares initial and final states of the program, thus comparing the program to itself, a database of known computer viruses is not required.

There also is a low probability of generating false positives using the method of the invention. Since desired modifications, such as the program being updated to a new version, are rarely performed on the program when the program is running, if the final state is different than the initial state, the user can assume that the program is most likely infected with a virus. Additionally, the initial and final states of the program are stored only in memory when the program is running and removed from memory when the invented method terminates. The invention does not have to generate and store data regarding the states of the program on a storage medium, and therefore does not consume substantial space on the storage medium.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out the invention. Various modifications, however, will remain readily apparent to those skilled in the art, since the generic principles of the present invention have been defined herein. Further, while the following discussion is directed to a single occurrence of implementing the method of the present invention on a single executable computer program, it is to be understood that the method may be used with several different executable programs on a storage medium.

Figure 1:
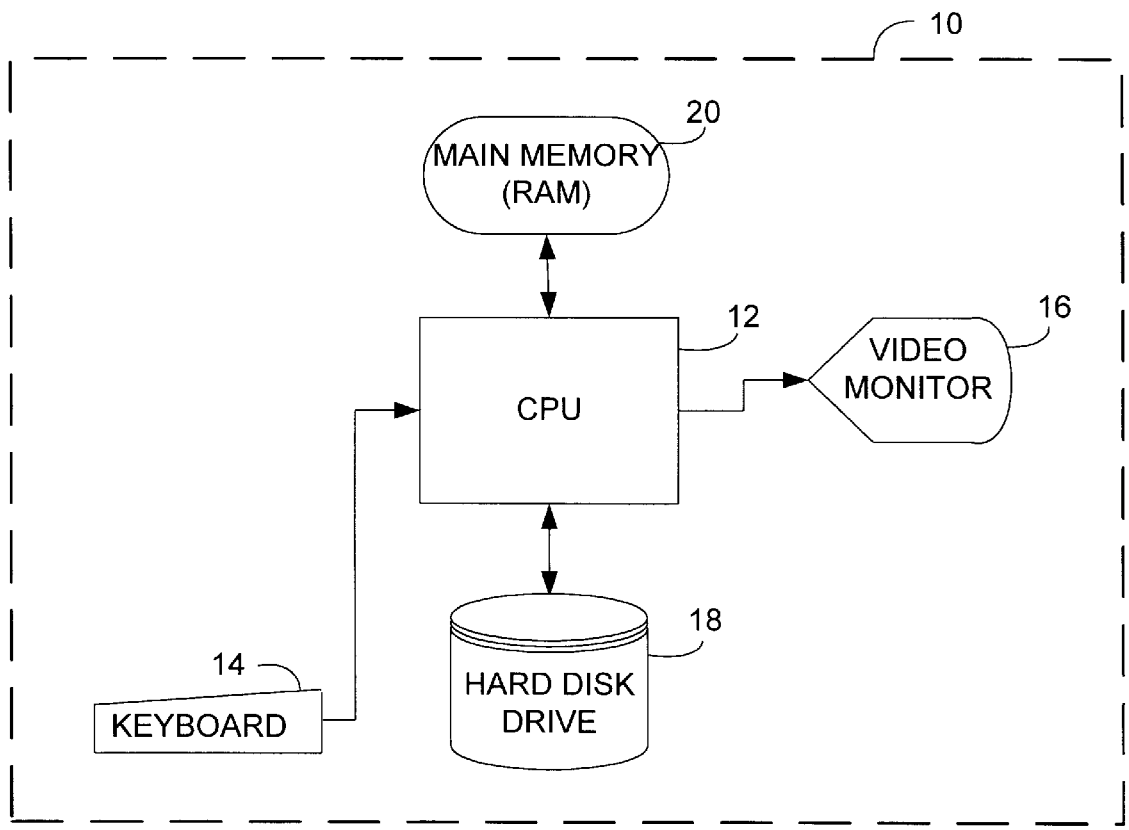
FIG. 1 is a schematic representation of a computer system for implementation of the preferred embodiment of the method of the present invention.

Referring now to FIG. 1 of the drawings, there is shown a schematic representation of a computer system 10 for implementation of the method of the present invention. The computer system 10 typically comprises a central processing unit (CPU) 12 for processing data, an input means such as a keyboard 14, or mouse (not shown) for data input, and an output means such as a video monitor 16 so that a user can view data being processed by the CPU 12. The computer system 10 is further provided with a known magnetic storage medium 18, such as a hard disk drive or floppy disk drive (not shown).

For data processing, the user typically calls an executable computer program 30 (shown in FIG. 2) stored on the hard disk 18 into a main memory 20, such as a well known random access memory (RAM). Executable computer programs typically comprise a series of instructions or code that are executed by the computer's operating system for data processing. Such programs are usually provided with either an "EXE" or "COM" suffix, to indicate to the user that the program is for data processing. These types of programs are designed to operate in such operating systems as Microsoft Windows or MS-DOS (Microsoft-Disk Operating Systems, both are registered trademarks of Microsoft Corporation).

Once the CPU 12 calls the executable program 30 into memory 20, the CPU 12 begins processing the program 30. While being processed, the program 30 may may invoke a second executable program. When a first executable program invokes a second executable program, the first program is typically referred to as a "parent" program and the second program is referred to as a "child" program. The child program may invoke a third program, in which case, the third program becomes the child program to the second program, while the second program becomes the third program's parent. When processing of any executable program 30 is completed, the program 30 is removed from memory 20 and remains on the hard disk 18 for future use. As each child program is removed from memory 20, control of data processing on the computer system 10 is returned to the next parent program, and eventually the computer's operating system.

Figure 2A:
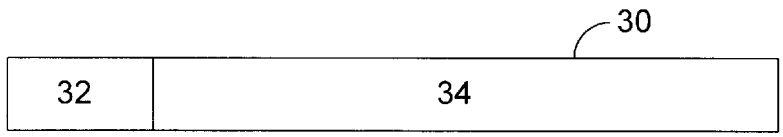
FIGS. 2A is a block diagram illustrating an executable program.

Referring to FIG. 2A of the drawings, there is shown an uninfected or clean executable computer program 30. The program 30 comprises a series of instructions or code 34 for data processing. The code 34 includes a header portion 32 that contains specified information regarding program loading, such as the entry point of the program 30 and initial stack location.

Figure 2B:
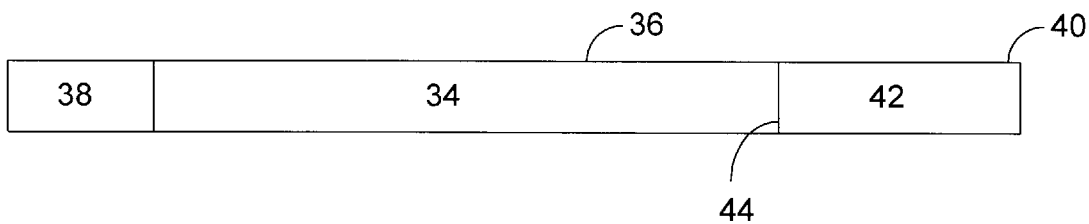
FIGS. 2B is a block diagram illustrating an executable program infected by a computer virus program.

FIG. 2B shows an executable program 36 that has been infected by a computer virus program 40. Computer virus programs 40 use various different means to infect executable programs 30. The virus program 40 shown, has added its code 42 to an end 44 of the program 36 and modified the program's header, resulting in a modified header portion 38. The virus 40 modifies the header 38 to enable loading of the virus code 42 instead of the program code 34 when the program 36 is executed. Thus, the state of the infected program 36 is different than the state of the clean program 30. The virus 40 has increased the length of the program 36 by adding its code 42 to the program 36 and has modified the program's header 38 for loading the virus code 42.

Figure 3:
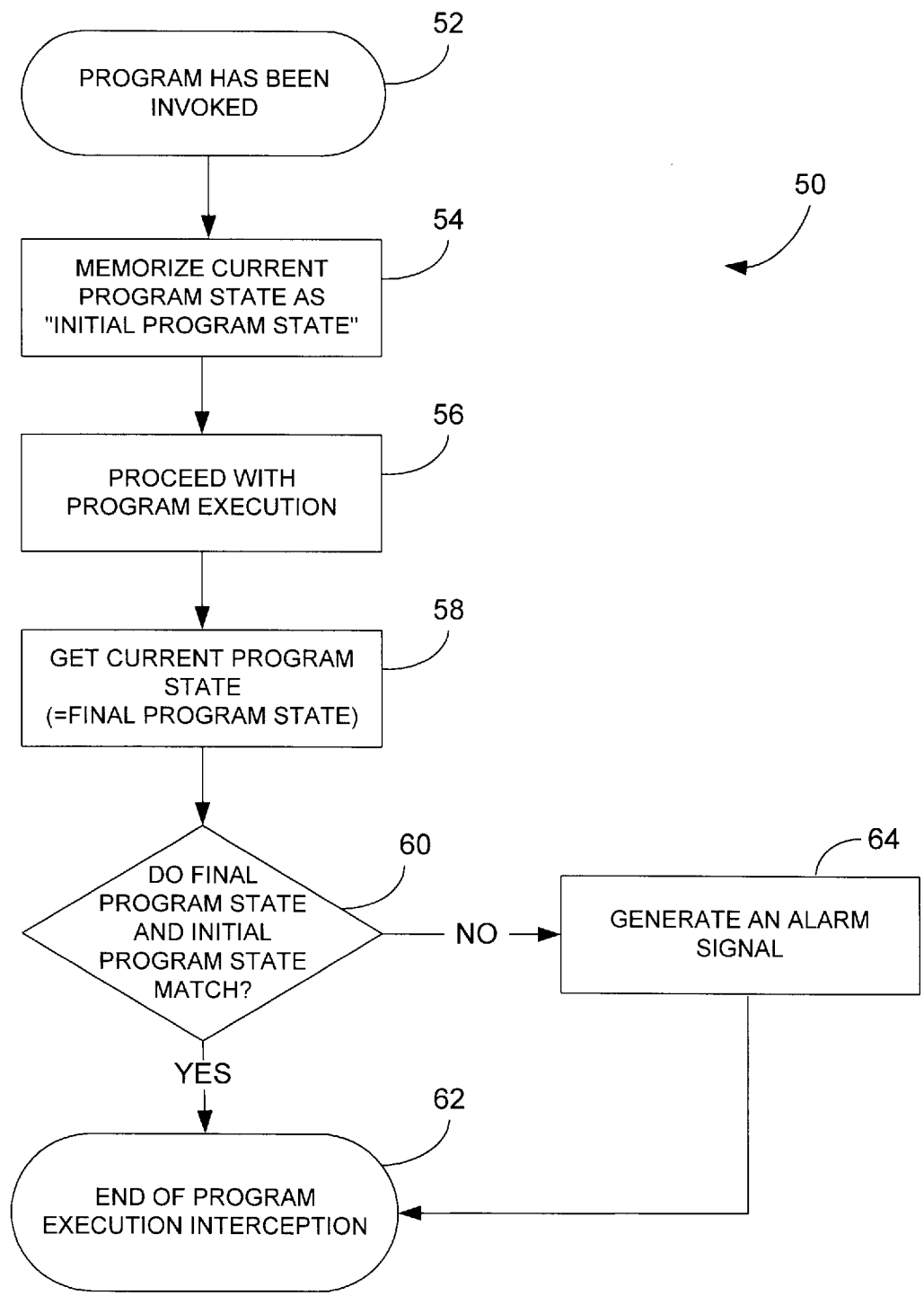
FIG. 3 is a flow diagram of the method of the preferred embodiment of the present invention.

Referring now to the drawings, and particularly to FIG. 3, there is shown a flow diagram 50 of the preferred embodiment of the method of the present invention. It is to be understood, that the invented method may comprise a computer software program or other suitable means for implementing the present invention in the computer system 10, or other appropriate device. It is further to be understood, that the method of the present invention is invoked each time a computer user or a program invokes an executable program 30 in order to read the program from the hard drive 18 and call the program into memory 20 for executing the program 30. Thus, the method is invoked when a parent program 30 is called into memory 20 and invoked each time a child program is called into memory 20 for execution.

As shown in block 52, when a computer user or program accesses an executable program 30, such as by reading the program 30 from the hard drive 18 for loading the program 30 into memory 20, the invented method is simultaneously invoked, prior to the program 30 being stored in memory 20. Thus, as the program 30 is being loaded into memory 20, as shown in process block 54, the invented method reads some pertinent information regarding the program, such as program length, header 32, or any other desired data or information, and stores the information into memory 20 to mark the program 30 in an initial state, for future use. In process block 56 executing of the program 30 continues, for data processing.

In process block 58, execution of the program 30 is completed. The method again stores the pertinent information regarding the program into memory 20, to mark that state of the program 30 as a final state. Alternatively, after the initial state of the program 30 is stored into memory 20 in process block 54, at the moment when processing of the program 30 commences, that state of the program 30 is stored into memory 20 as the final state, as opposed to when processing of the program 30 is completed.

In decision block 60 the method of the present invention compares the final state of the program 30 to the initial state. If the pertinent information indicating the final state of the program 30 matches the pertinent information indicating the initial state, then it is confirmed that the program 30 has not been infected by a virus 40. The invented method then continues to process block 62 where the method terminates.

Returning to decision block 60, if it is determined that the pertinent information indicating the final state of the program 30 does not match the pertinent information indicating the initial state, then an alarm signal is generated at process block 64. The alarm signal is generated to inform the user that the program 30 can be considered to have been modified by the virus 40, and is now an infected program 36. The method then continues to block 62 where the method of the present invention terminates.

Figure 4:
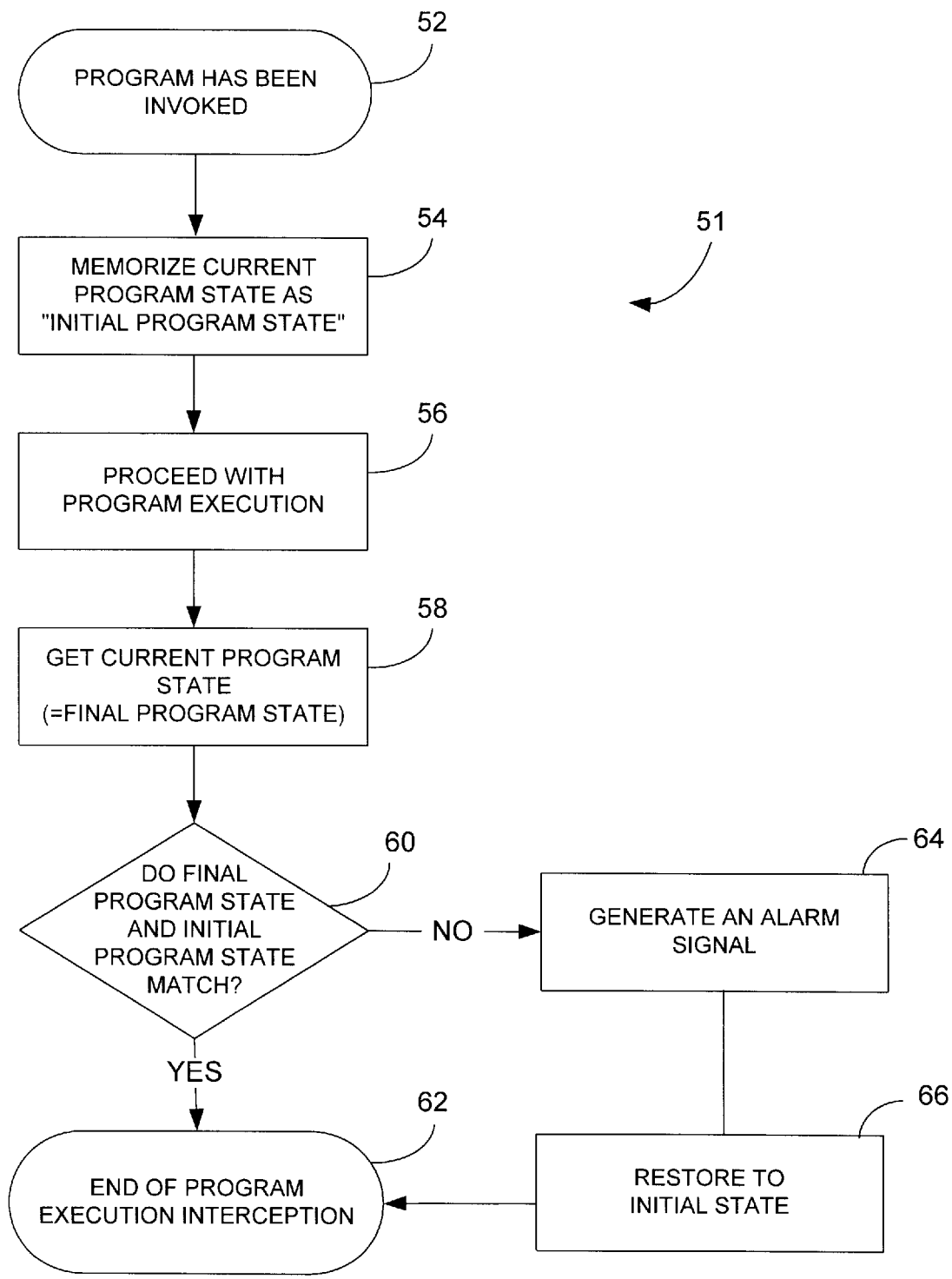
FIG. 4 is a flow diagram of the method of an alternative embodiment of the present invention.

Referring now to FIG. 4 of the drawings, there is shown a flow diagram 51 of an alternative embodiment of the invented method. Returning to decision block 60, if it is determined that the final state of the program 30 does not match the initial state, then the alarm signal is generated at process block 64. The alarm signal is generated to inform the user that the program is now an infected program 36. The method then continues to process block 66 where the method of the present invention invokes a known backup and restore technique, such as by reading the pertinent information indicating the program's initial state from memory 20, then restoring the infected program 36 to its initial state 30. Once the program 30 is restored to its initial state, the method continues to process block 62 where the alternative method 51 of the present invention terminates.

Thus, there has been described an improved method for detecting the infection of executable computer software programs by memory resident computer software virus programs. Since the invented method compares the state of the program when it is initially invoked, to the state of the program when it is either terminated or when processing has just commenced, the method of the present invention does not require any modification of the program. Thus, loading or processing of the program is not adversely affected. Further, since the invented method compares initial and final states of the program, a database of known computer viruses is not required. There also is a low probability of generating false positives using the method of the invention, since desired modifications are rarely performed on the program when the program is running. Additionally, the initial and final states of the program are stored only in memory when the program is running and removed from memory when the invented method terminates. The invention does not have to generate and store data regarding the states of the program on a storage medium, and therefore does not consume substantial space on the storage medium.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for detecting infection of executable computer software programs by memory resident computer software virus programs, the method comprising the steps of:

provi ding a computer system that includes input means, output means, processing means, memory means, and a storage medium;

providing a parent and an executable child computer program stored on the storage medium for processing by the processing means;

the parent program accessing the child program for loading the child program into memory to execute the child program;

the parent program simultaneously reading first data from one or more predetermined locations indicative of viral infection of the child program as the child program is being loaded into memory and storing the first data in memory to provide information indicating an initial state of the child program;

executing the child program for data processing;

upon termination of the child program execution, the parent program reading second data from the one or more predetermined locations indicative of viral infection of the child program and storing the second data in memory to provide information indicating a final state of the child program:

the parent program comparing the first data indicating the initial state of the child program to the second data indicating the final state of the child program for determining differences between the initial state and final state of the child program;

if it is determined that the initial state of the child program is different than the final state of the child program, the parent program then generating an alarm signal; and if it is determined that the final state of the child program is the same as the initial state, the parent program then not generating an alarm signal.

2. The method of claim 1 wherein a plurality of executable computer programs are stored on the storage medium for processing by the processing means and for detecting infection of the programs by software viruses.

3. The method of claim 1 wherein the parent program is an operating system of the computer system.

4. In a computer system that includes input means, output means, processing means, a memory, and a storage medium, the storage medium having a parent and one or more executable child computer programs stored thereon for processing of the programs by the processing means, a method for detecting infection of executable computer software programs by memory resident computer software virus programs, the method comprising the steps of:

the parent program accessing a desired one of the child programs for loading the child program into memory to execute the child program;

the parent program simultaneously reading first data from one or more predetermined locations indicative of viral infection of the child program as the child program is being loaded into memory and storing the first data in memory to provide information indicating an initial state of the child program;

commencing execution of the child program for data processing;

upon commencement of the child program execution, the parent program reading second data from the one or more predetermined locations indicative of viral infection of the child program and storing the second data in the memory means to provide information indicating a final state of the child program;

the parent program comparing the first data indicating the initial state of the child program to the second data indicating the final state of the child program for determining differences between the initial state and final state of the child program;

if it is determined that the initial state of the child program is different than the final state of the child program, the parent program then generating an alarm signal; and if it is determined that the final state of the child program is the same as the initial state, then not generating an alarm signal.

5. In a computer system that includes input means, output means, processing means, a memory, and a storage medium, the storage medium having a parent and one or more executable child computer programs stored thereon for processing of the programs by the processing means, a method for detecting infection of executable computer software programs by memory resident computer software virus programs, the method comprising the steps of:

the parent program accessing a desired one of the child programs for loading the child program into memory to execute the child program;

the parent program simultaneously reading first data from one or more predetermined locations indicative of viral infection of the child program as the child program is being loaded into memory and temporarily storing the first data into memory to provide an initial data set indicating an initial state of the child program, the first data selected from the group consisting of program length, program header information, and program code;

executing the child program for data processing;

upon termination of the child program execution, the parent program reading second data from the one or more predetermined locations indicative of viral infection of the child program and temporarily storing the second data into memory to provide a final data set indicating a final state of the child program;

the parent program comparing the initial data set to the final data set for determining differences between the first data comprising the initial data set and the second data comprising the final data set for determining if the child program has been modified by a computer virus;

if it is determined that the initial data set is different than the final data set, the parent program then generating an alarm signal; and if it is determined that the second data comprising the final data set is the same as the first data comprising the initial data set, the parent program then not generating an alarm signal.

6. The method of claim 5 comprising the further step, upon completion of the aforementioned steps, of:

removing the first data comprising the initial data set and removing the second data comprising the final data set from memory.

7. A method for detecting and restoring from infection of executable computer software programs by memory resident computer software virus programs, the method comprising the steps of:

(a) providing a computer system that includes input means, output means, processing means, memory means, and a storage medium;

(b) providing a parent and a plurality of executable child computer programs stored on the storage medium for processing by the processing means;

(c) the parent program accessing a desired one of the child programs for loading the child program into memory to execute the child program:

(d) the parent program simultaneously reading first data from one or more predetermined locations indicative of viral infection of the child program as the child program is being loaded into memory and temporarily storing the first data in memory to provide an initial data set indicating an initial state of the child program, the first data selected from the group consisting of program length, program header information and program code;

(e) commencing execution of the child program for data processing;

(f) upon commencement of the child program execution, the parent program reading second data from the one or more predetermined locations indicative of viral infection of the child program and temporarily storing the second data in memory to provide a second data set indicating a second state of the child program;

(g) the parent program comparing the first data comprising the initial data set to the second data comprising the second data set for determining differences between the initial data set and the second data set for determining if the child program has been modified by a computer virus program;

(h) if it is determined that the initial data set is different than the second data set and that the child program has been modified by a computer virus program, the parent program then generating an alarm signal and invoking a backup and restore operation, the backup and restore operation including restoring the child program to the initial state;

(i) if it is determined that the second data comprising the second data set is the same as the first data comprising the initial data set, the parent program then not generating an alarm signal;

(j) removing the first data comprising the initial data set and the second data comprising the second data set from memory;

(k) calling another one of the child programs stored on the storage medium into memory for executing the child program;

(l) repeating steps d through j for determining if the child program has been modified by a computer virus and for restoring the child program to the initial state; and (m) repeating steps k and l for each child program to be executed by the computer system.

8. The method of claim 7 wherein step f further comprises, upon termination of the child program execution, the parent program reading third data from the one or more predetermined locations indicative of viral infection of the child program and temporarily storing the third data in memory to provide a final data set indicating a final state of the child program; and wherein further steps g through j include performing all steps with respect to the third data as are specified in such steps with respect to the second data.

9. A method for detecting and restoring from infection of executable computer software programs by memory resident computer software virus programs, the method comprising the steps of:

providing a computer system that includes input means, output means, processing means, memory means, and a storage medium;

providing a parent and an executable child computer program stored on the storage medium for processing by the processing means;

the parent program accessing the child program for loading the child program into memory to execute the child program;

the parent program simultaneously reading first data from one or more predetermined locations indicative of viral infection of the child program as the child program is being loaded into memory and storing the first data in memory to provide information indicating an initial state of the child program;

executing the child program for data processing;

upon termination of the child program execution, the parent program reading second data from the one or more predetermined locations indicative of viral infection of the child program and storing the second data in memory to provide information indicating a final state of the child program;

the parent program comparing the first data indicating the initial state of the child program to the second data indicating the final state of the child program for determining differences between the initial state and final state of the child program; and if it is determined that the initial state of the child program is different than the final state of the child program, the parent program then generating an alarm signal and invoking a backup and restore operation, such operation including restoring the child program to the initial state; and if it is determined that the final state of the child program is the same as the initial state, the parent program then not generating an alarm signal.

10. In a computer system that includes input means, output means, processing means, a memory, and a storage medium, the storage medium having a parent and one or more executable child computer programs stored thereon for processing of the programs by the processing means, a method for detecting and restoring from infection of executable computer software programs by memory resident computer software virus programs, the method comprising the steps of:

the parent program accessing a desired one of the child programs for loading the child program into memory to execute the child program;

the parent program simultaneously reading first data from one or more predetermined locations indicative of viral infection of the child program as the child program is being loaded into memory and storing the first data in memory to provide information indicating an initial state of the child program;

commencing execution of the child program for data processing;

upon commencement of the child program execution, the parent program reading second data from the one or more predetermined locations indicative of viral infection of the child program and storing the second data in the memory means to provide information indicating a final state of the child program;

the parent program comparing the first data indicating the initial state of the child program to the second data indicating the final state of the child program for determining differences between the initial state and final state of the child program;

if it is determined that the initial state of the child program is different than the final state of the child program, the parent program then generating an alarm signal and invoking a backup and restore operation, such operation including restoring the child program to the initial state; and if it is determined that the final state of the child program is the same as the initial state, the parent program then not generating an alarm signal.

11. In a computer system that includes input means, output means, processing means, a memory, and a storage medium, the storage medium having a parent program one or more executable child computer programs stored thereon for processing of the child programs by the processing means, a method for detecting and restoring from infection of executable computer software programs by memory resident computer software virus programs, the method comprising the steps of:

the parent program accessing a desired one of the child programs for loading the child program into memory to execute the child program;

the parent program simultaneously reading first data from one or more predetermined locations indicative of viral infection of the child program as the child program is being loaded into memory and temporarily storing the first data into memory to provide an initial data set indicating an initial state of the child program, the first data selected from the group consisting of program length, program header information, and program code;

executing the child program for data processing;

upon termination of the child program execution, the parent program reading second data from the one or more predetermined locations indicative of viral infection of the child program and temporarily storing the second data into memory to provide a final data set indicating a final state of the child program;

the parent program comparing the initial data set to the final data set for determining differences between the first data comprising the initial data set and the second data comprising the final data set for determining if the child program has been modified by a computer virus;

if it is determined that the initial state of the child program is different than the final state of the child program, the parent program then generating an alarm signal and invoking a backup and restore operation, such operation including restoring the child program to the initial state; and if it is determined that the final state of the child program is the same as the initial state, the parent program then not generating an alarm signal.

* * * * *